United States Patent
Delamour et al.

(10) Patent No.: US 8,757,796 B2
(45) Date of Patent: Jun. 24, 2014

(54) FRAME FOR SPECTACLES WITH TELESCOPIC HINGES, AND HINGE FOR THE FRAME

(76) Inventors: Dominique Delamour, Les Mesnuls (FR); Alain Miklitarian, Paris (FR); Olivier Rodi, Gambais (FR); Richard Chene, Neuilly (FR)

(*) Notice: Subject to any disclaimer, the term of this patent is extended or adjusted under 35 U.S.C. 154(b) by 0 days.

(21) Appl. No.: 13/254,376

(22) PCT Filed: Feb. 26, 2010

(86) PCT No.: PCT/EP2010/052473
§ 371 (c)(1),
(2), (4) Date: Sep. 22, 2011

(87) PCT Pub. No.: WO2010/100087
PCT Pub. Date: Sep. 10, 2010

(65) Prior Publication Data
US 2012/0026452 A1  Feb. 2, 2012

(30) Foreign Application Priority Data
Mar. 3, 2009  (FR) .................................. 09 00965

(51) Int. Cl.
G02C 5/14  (2006.01)
G02C 5/22  (2006.01)

(52) U.S. Cl.
CPC .................................. G02C 5/2236 (2013.01)
USPC ........................................ 351/121; 351/113

(58) Field of Classification Search
USPC ................................................. 351/111–118
See application file for complete search history.

(56) References Cited

U.S. PATENT DOCUMENTS 3,837,735 A * 9/1974 Guillet .......................... 351/113
5,115,540 A    5/1992 Delorme
(Continued)

FOREIGN PATENT DOCUMENTS

FR  2 178 828 A  11/1973
FR  2 542 099 A   9/1984
(Continued)

OTHER PUBLICATIONS

English translation of Written Opinion completed Apr. 22, 2010 and mailed May 3, 2010 from corresponding International Application No. PCT/EP2010/052473 filed Feb. 26, 2010 (13 pages).
(Continued)

*Primary Examiner* — Scott J Sugarman
*Assistant Examiner* — Robert E Tallman
(74) *Attorney, Agent, or Firm* — Klein, O'Neill & Singh, LLP (57) ABSTRACT

The present disclosure relates to a frame which comprises a front surface, extended by two lateral posts and two arms hinged to the posts about the hinge pins of two telescopic hinges, each of which, with a front surface element rigidly connected to a post and an arm element, is rigidly connected to an arm that comprises a slide hinged on the front surface element, and mounted in a sheath against a spring and slidable by means of the latter; the front surface element and the sheath of the arm element engaging, in the open position of the arm, by at least two matching transverse surfaces for stopping the opening. The surfaces that stop the opening of the two elements of each hinge are rough, the surface that stops the opening of one of the elements, of the surface, and of the arm having a hollow intermediate area. Thanks to the present method, system and device, the frame hinges have a reduced size with the same performance.

20 Claims, 7 Drawing Sheets

(56) References Cited

U.S. PATENT DOCUMENTS

| | | | |
|---|---|---|---|
| 7,350,271 B2* | 4/2008 | Genelot | 16/228 |
| 7,572,005 B2* | 8/2009 | Hotellier | 351/113 |

FOREIGN PATENT DOCUMENTS

| | | |
|---|---|---|
| FR | 2 796 471 A | 1/2001 |
| FR | 2 838 530 A | 10/2003 |
| FR | 2 905 477 A | 3/2008 |
| WO | WO 2008/096251 A1 | 8/2008 |

OTHER PUBLICATIONS

International Search Report and Written Opinion completed Apr. 22, 2010 and mailed May 3, 2010 from corresponding International Application No. PCT/EP2010/052473 filed Feb. 26, 2010 (12 pages).

* cited by examiner

FRAME FOR SPECTACLES WITH TELESCOPIC HINGES, AND HINGE FOR THE FRAME

CROSS-REFERENCE TO RELATED APPLICATIONS

This is a national phase application under 35 U.S.C. §371 of PCT Application No. PCT/EP2010/052473, filed Feb. 26, 2010, which claims the benefit of French application No. 09/00965, filed Mar. 3, 2009, the contents of which are expressly incorporated herein by reference.

FIELD OF ART

The present disclosure relates to spectacle frames.

BACKGROUND

A spectacle frame comprises a front side and two side-pieces being jointly mounted each on a side tenon of the front side by means of a hinge.

In an opening position, a spectacle side-piece extends substantially at right angle of the general plane of the front side.

A telescopic hinge allows the side-piece to be opened beyond such right angle. It provides thanks to such an overopening more comfort when the frame is put on the nose and it precludes the risk of breaking or deforming the frame and the side-pieces.

A telescopic hinge for a spectacle frame generally comprises a spring for sticking the side-piece against the head, but precisely allows such an overopening.

A telescopic hinge generally comprises two elements assembled on a joint axis and integral with respectively a front side tenon (front element) and a side-piece (side-piece element), more particularly of the tang of the side-piece being the core on which it is formed, when such a core does not form the side-piece by itself. It may also occur that the hinge is fastened directly to the side-piece, even when it is provided with a tang, the fastening occurring on the end of the side-piece also referred to as side-piece tenon.

The side-piece element integral with the side-piece comprises a slide mounted, on the one hand, on the joint axis and, on the other hand, in a sheath being internal with the core or the side-piece itself. Sliding of the slide in the sheath occurs against and under the action of a spring, generally a compression spring, also extending in the sheath.

The front element of the hinge cooperates with the front portion of the sheath of the side-piece element, referred to as the base.

In current frames, when at rest with the side-pieces in an opened position, the front element and the base of the side-piece element of a telescopic hinge cooperate via two planar surfaces (or two pairs of planar surfaces), in abutment against each other, substantially parallel to the joint axis.

In other words, the two hinge elements are joined according to a plane, substantially parallel to the general plane of the front side and substantially perpendicular to the general plane of the associated side-piece of frame.

When the side-piece of frame is rotated around the joint axis of the hinge, from the opening position to the closing position, the joint surface of the base of the side-piece element pivots about the internal area of the joint surface of the front element, until the side-piece suddenly tilts due to the cam surface adjacent to the planar joint surface of the front element.

In such pivoting conditions, the compression of the hinge spring is not full and the return function is a little loose.

Being unable to fully take advantage of the whole force of the springs, manufacturers were compelled to oversize them and the other hinge parts as well.

For sake of universality, to take into consideration the large variety of frame designs, the Applicants tried, at equal performance, to reduce the size of spectacle hinges and this is how they provide their method, system and device.

SUMMARY

The present method, system and device thus relate to a spectacle frame comprising a front side, extended with two side tenons, and two side-pieces jointed on the tenons around hinging axes of two telescopic hinges each with a front element being integral with a tenon and a side-piece element being integral with a side-piece, the side-piece element of a hinge comprising a slide being jointed on the front element and mounted slidably in a sheath against and under the action of a spring, the front element and the sheath of the side-piece element of the hinge cooperating, in an opening position of the side-piece, via at least two complementary transversal opening rest surfaces, substantially parallel to the joint axis of the hinge, said frame being characterized in that the opening rest surfaces of the two elements of each hinge are irregular, the opening rest surface of one of the front and side-piece elements having a recessed intermediary area.

First of all, it should be noticed that the two front and side-piece elements of each hinge, in the opening rest position of the side-piece, cooperate through form linking. If the surface of one of the elements has a recessed intermediary area, the surface of the other element thus has a raised intermediary area.

From the recessed area, the opening rest surface of the front element, as far as it is concerned, tilts in the direction of the end of the associated side-piece so that, upon the side-piece closing pivoting, during which two surface portions roll or slide on each other, the spring of the hinge is considerably biased, more than with two planar surfaces. Using the whole force of the spring, it can be therefore smaller than in the prior art.

By means of the recessed and raised areas of the front and side-piece elements of each hinge, the opening rest position of the associated side-piece is thus predetermined and unchanging. These are centring areas of the side-piece.

Preferably, the opening rest surface of the side-piece element having thus a raised intermediary area, this raised area is located in the plane defined by the joint axis of the hinge and the associated slide.

In the preferred embodiment of the frame of the present method, system and device, the transversal opening rest surface of the front element is extended with a lateral closing rest surface being also irregular, preferably also complementary to the transversal opening rest surface of the side-piece element, advantageously substantially symmetric of the transversal opening rest surface with respect to a plane defined by the joint axis of the hinge and the joint area of the two transversal opening and lateral closing rest surfaces.

Still preferably, the side-piece element of each hinge comprises a first closing lug arranged for allowing for the complete tilting of the side-piece against the rear of the front side and a second closing lug arranged for coming in abutment against a shoulder of the front element and preventing the full tilting of the side-piece, the two lugs being arranged substantially symmetrically with respect to the plane defined by the joint axis and the corresponding slide, whereby mounting a hinge on a side-piece of a frame and another hinge being identical but up-down on the other side-piece, the first side-piece can be tilted on the first side-piece and the second side-piece on the first one in a closing position.

The present method, system and device, such as claimed herein above, relates to a spectacle frame with two side-pieces jointed on a front side of the frame, each by a telescopic hinge.

The front side could be foldable around another hinge, even also a telescopic hinge.

The side-pieces can also be foldable each around a hinge, even also a telescopic hinge.

Thus, the spectacle frame could comprise from two to five hinges.

In such conditions, the Applicants further wish to claim a telescopic hinge for a spectacle frame comprising a first element being integral with a first part of frame and a second element being integral with a second part of frame, the second element of the hinge comprising a slide jointed on the first element and mounted slidably in a sheath against and under the action of a spring, the first element and the sheath of the second element of the hinge cooperating, in an opening position, by at least two complementary transversal opening rest surfaces substantially parallel to the joint axis of the hinge, said hinge being characterized in that the opening rest surfaces of the two elements of the hinge are irregular, the opening rest surface of one of the two elements having a recessed intermediary area.

A hinge could be contemplated with two elements jointed about a single axis, i.e. a hinge with one single degree of freedom. It could also be contemplated on the frame of the present method, system and device hinges with two degrees of freedom, the two hinge elements being able to pivot one with respect to the other about two orthogonal axes. In such a case, the hinges are referred to as joints in the art. In such a case still, the inventive features of the hinge of the present method, system and device only relate to the only degree of freedom being considered above. Then, instead of a hinge joint axis, the hinge could comprise a knee being integral with the first hinge element on which the slide of the second element is fastened by a bent finger, whereby the second element can rotate about the knee around two orthogonal axes, one of which extends through a hole arranged in the knee and receiving the bent finger of the slide.

BRIEF DESCRIPTION OF THE FIGURES

The present method, system and device will become more evident from the following description of several embodiments of telescopic hinges for the spectacle frame of the present method, system and device, with reference to the appended drawing, in which.

DETAILED DESCRIPTION

Figure 1:
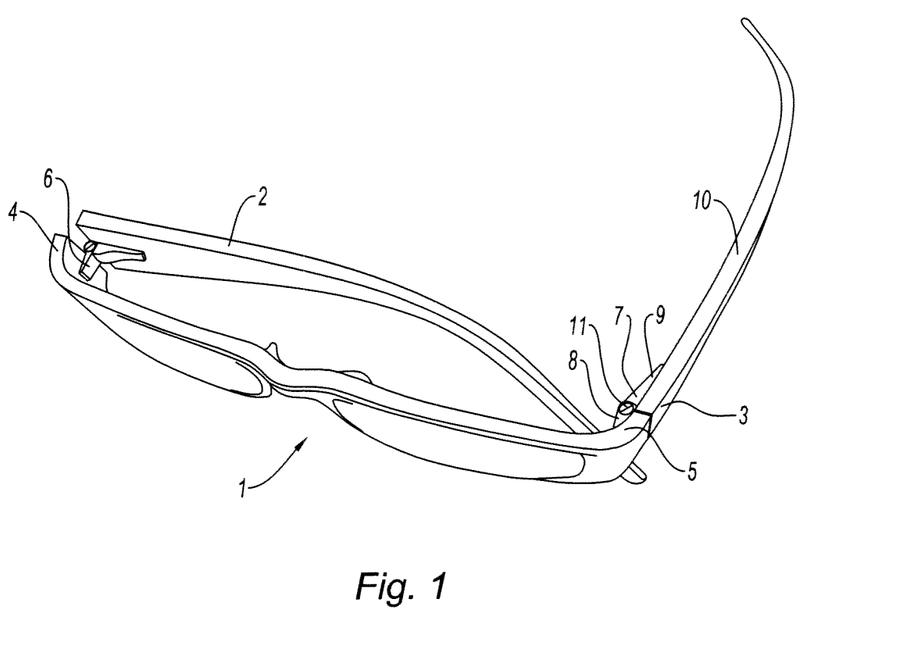
FIG. 1 is a top perspective view of a traditional spectacle frame.

The spectacle frame, that will be now described, comprises, with reference to FIG. 1, a front side 1 intended for receiving generally optical glasses, and a right side-piece 2 and a left side-piece 3, in the shown example, this one 2 being tilted against the rear of the front side 1 in a closing position and that one 3, in an opening position substantially perpendicular to the general plane of the front side 1. The front side 1 extends laterally, substantially at right angle, by two front side lateral tenons 4, 5 on which the side-pieces 2, 3 are jointed by means of two hinges 6, 7, here so-called telescopic hinges.

A telescopic hinge—that is for instance the left hinge 7—comprises an front side element 8, being integral with the front side tenon 5, and a side-piece element 9, being integral with the side-piece 3 and, more precisely here, with the core 10 of this side-piece on which it is formed.

The two hinge elements are jointed on a joint axis 11 being integral with the front side element 8.

The hinges 6, 7 of the two side-pieces 2, 3 are identical, except for one detail to be set forth later on, and this is why the following description only refers to one single hinge.

The side-piece element 9 comprises (FIG. 3) a slide 12 jointed on the joint axis 11 and mounted in a sheath 13 being integral with the core 10. The joint end of the slide 12 has the shape of a ring 14 through which the axis 11 extends. The sheath 13 extends, at the front, to the joint end 14 of the slide, via a base 15 here fitted into the sheath 13.

Figure 3:
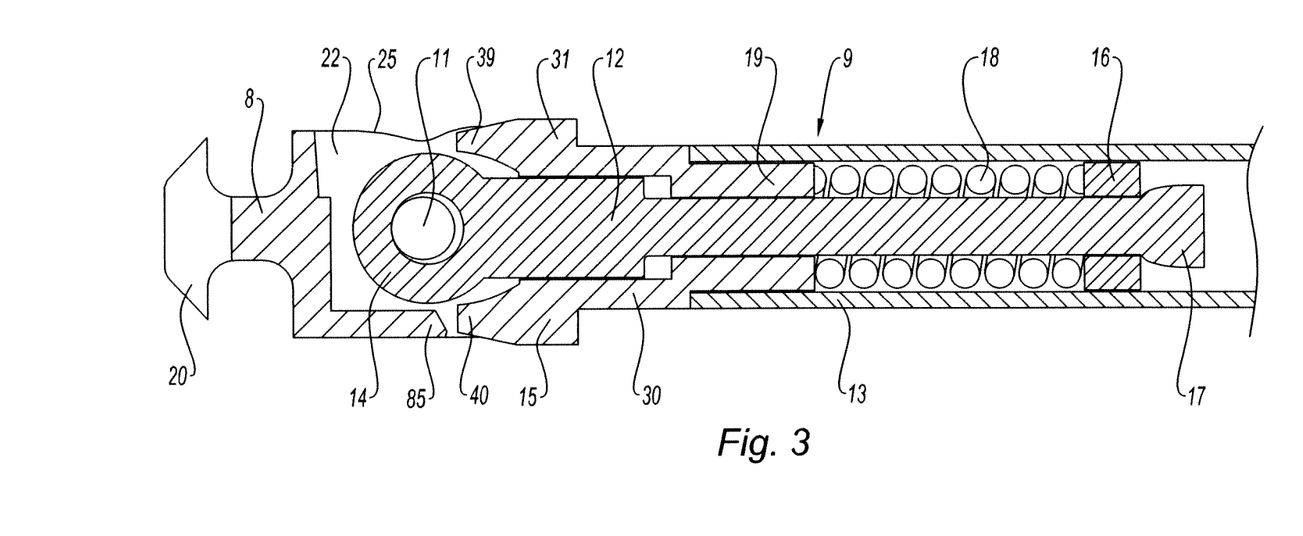
FIG. 3 is a longitudinal sectional view of the hinge of FIG. 2.

After a ring 16 has been mounted at the other end of the slide, this end 17 is deformed for specifically retaining this ring 16. Between the rear end 19 of the base 15 and the ring 16, a spring 18, here a compression spring, extends under and against the action of which the slide 12 could slide in the sheath 13. It should be noticed that, instead of a ring stopped as a result of a deformation of the end of the slide, for abutting the spring 18, a threaded slide end 40 could be contemplated (FIG. 7), as well as a threaded plug 41 on this end inside the sheath and a retaining insert mounted at the end of the sheath 13, for instance screwed therein.

The front side element 8 comprises here an anchoring nosepiece 20 for anchoring the element in front side tenon 5, such an element 8 extending to the rear, that is to the side-piece element 9, with two side areas 21, 22, separated by the ring 14 with a cylindrical surface being shrunk with respect to the edges of the two areas. The ring 14 is drilled with a bore 26 for receiving the joint axis 11.

Each area has (FIG. 5) a transversal rear edge 24 and an upper side edge 25, both having a particular shape substantially and globally parallel to the joint axis 11. The transversal rear edge 24 of each area has an irregular surface and, in the present case, with an intermediary recessed area 27. From this recessed area 27, the surface is tilted to the rear, in the direction of the end of the side-piece element 9, thus of the end of the side-piece 3. Of course, the rear transversal edges 24 of the two areas 21, 22 extend on the same common surface. Each rear edge 24 is thus extended with an upper side edge 25, beyond a rounded corner 28, the upper edge 25 being here irregular in the same way as the rear transversal edge 24 and, even here, symmetric of the edge 24 with respect to a plane defined by the joint axis 11 and the joint corner 28 of the two transversal 24 and upper edges 25. Of course still, the side upper edges 25 of the two cheeks 21, 22 extend on the same common surface.

Figure 5:
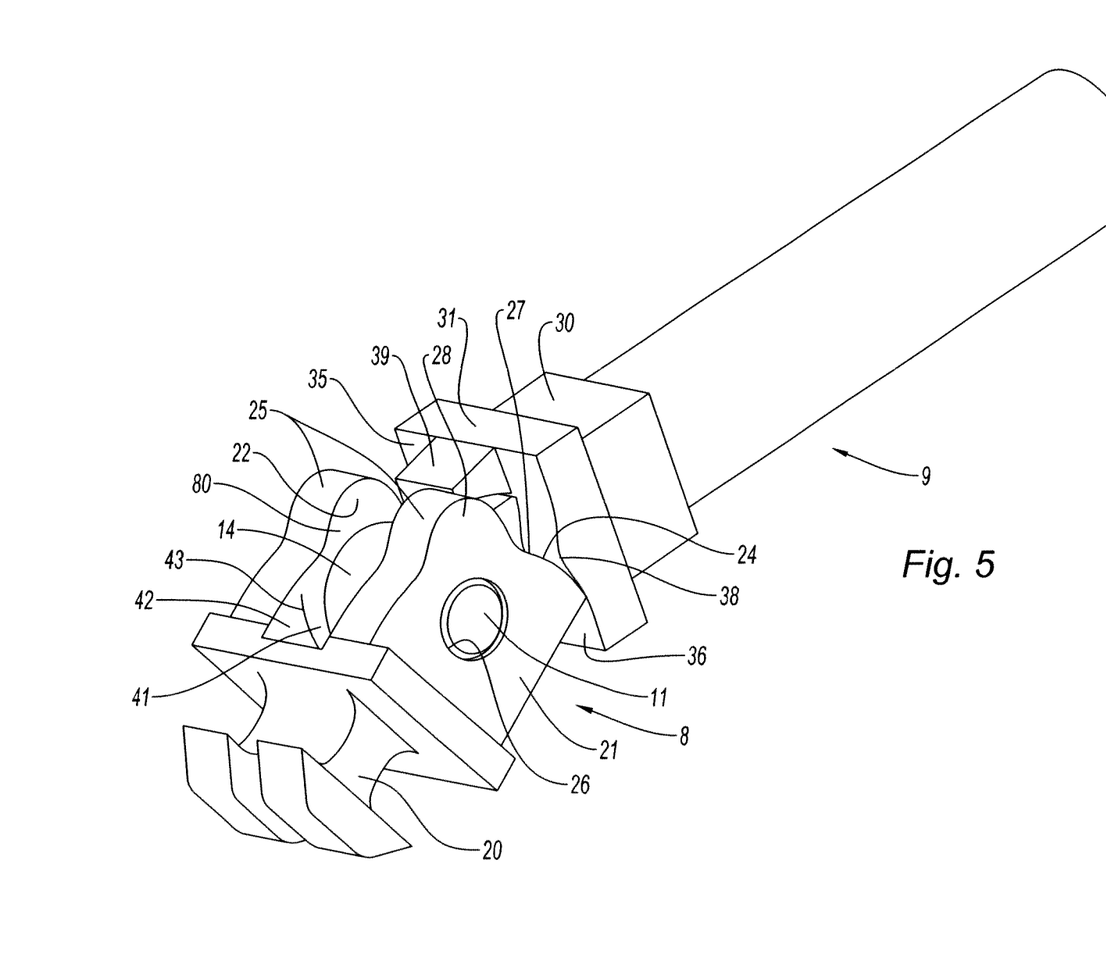
FIG. 5 is a perspective view of the hinge of FIG. 2, in an intermediary closing position of the side-piece.

It should be noticed that the front side element 8 comprises a nosepiece 20 being shaped for anchoring the element in the front side tenon. A front side element could be provided being integral with the front side tenon differently, for instance via gluing, welding, screwing, etc.

The base 15 (FIG. 4) is fitted into the sheath 13 via a tubular rear tail 19, with a fastening land 29. Being formed on a small parallelepipedic base 30, adjacent to the tail 29, a front crown 31 is intended for cooperating with the front side element 8. The crown 31, with a general rectangular shape, via its external transversal profile, or periphery, 32 and its internal axial bore 33, comprises a particular front edge 34. It comprises two front side edges 35, 36 being irregular in a way complementary to that of the rear transversal edges 24 of the front side element 8. Thus, the edges 35, 36 have an intermediary raised area 37, 38 intended for matching the recessed intermediary area 27 of the rear transversal edges 24 of the front side element 8.

Figure 4:
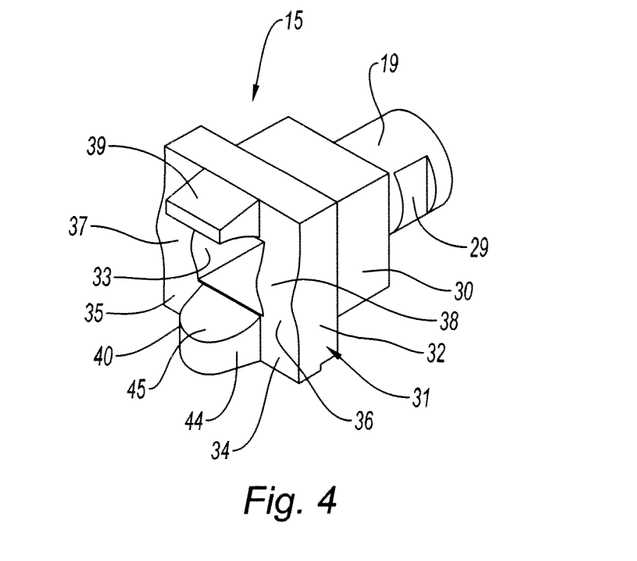
FIG. 4 is a perspective view of the base of the sheath for the side-piece element of the hinge of FIG. 2.

The irregular edges 35, 36 extend up to the periphery edges of the crown 31. It should be noticed that the raised areas 37, 38 are globally located in the plane defined by the joint axis 11 of the hinge and by the slide 12.

Between the two irregular edges 35, 36 between the periphery 32 and the bore 33, two closing lugs 39, 40 extend. These lugs extend parallel to the axis of the sheath 13 and one 40 is tapered towards the front. The internal sides 40 of the cheeks 21 and 22, of the side of the upper side edges 25, are curved inward for joining one another and forming a nearly cylindrical surface 41 chamfered by a nearly spherical portion of surface 42 forming a retaining shoulder for the lug 39 being not shrunk to the front whereas the front shrunk lug 40 cannot come in abutment against this shoulder 42. This shoulder 42 forms with the internal cylindrical surface 41 a curvilinear ridge 43.

Having described the structure of the hinge, its operation will be now been set forth.

The rear transversal surfaces 24 of the front side element 8 and the front transversal surfaces 35, 36 of the base 15 of the side-piece element 9 are opening rest surfaces being complementary. The lateral upper surfaces 25 of the front side element 8 and the front transversal surfaces 35, 36 of the base 15 are closing rest surfaces being here also complementary. In an opening rest position, from the recessed area 27 of the front side element, the surface 24 tilts towards the end of the side-piece; similarly, from the raised area 37, 38 of the base 15, the surface 35, 36 also tilts towards the end of the side-piece. Upon the closing pivoting of the side-piece, the surface 35, 36 rolls (slides) on the surface 24 strongly biasing the spring 18.

The recessed areas 25 and 27 and the raised areas 37, 38 of the front side and side-piece elements (8, 9) are rest areas with a predetermined and unchanging position. Upon the opening, these are centring areas for the side-piece.

Figure 6:
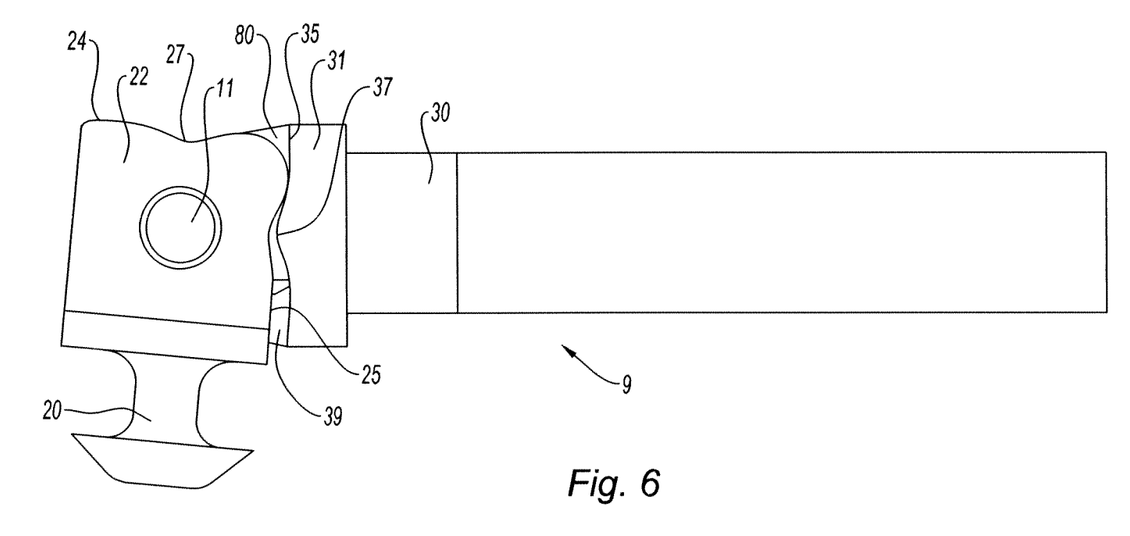
FIG. 6 is a side view of the hinge of FIG. 2, nearly in a closing position.
Figure 7:
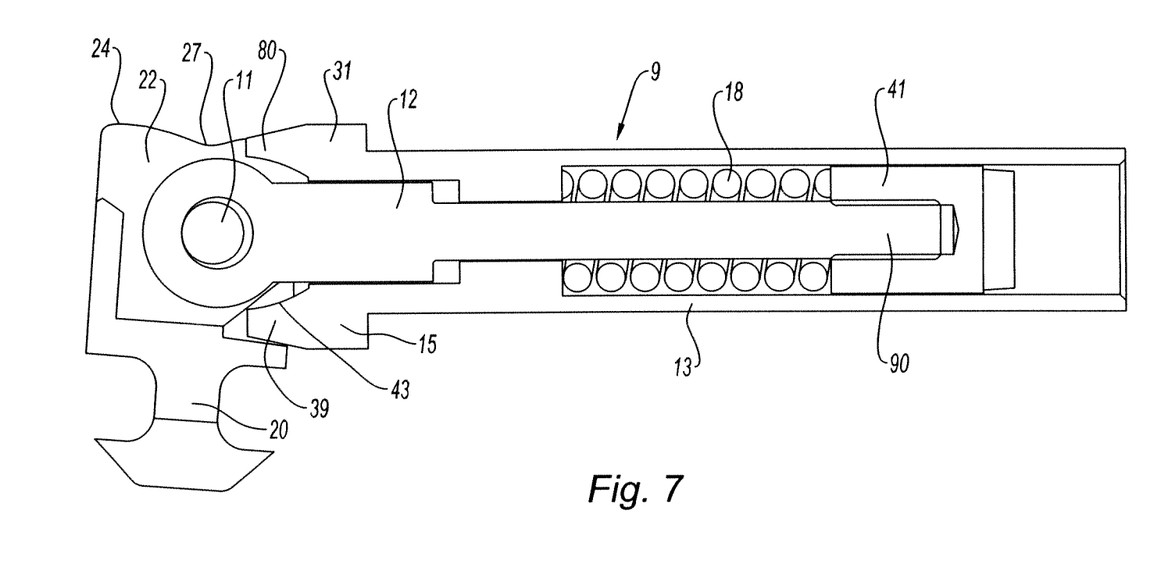
FIG. 7 is a sectional view of another embodiment of a hinge of the frame of the present method, system and device, in a tilted side-piece position on each other.

In the exemplary embodiment as shown on FIGS. 5-7, the unshrunk closing lug 39 is in an internal position.

Figure 2:
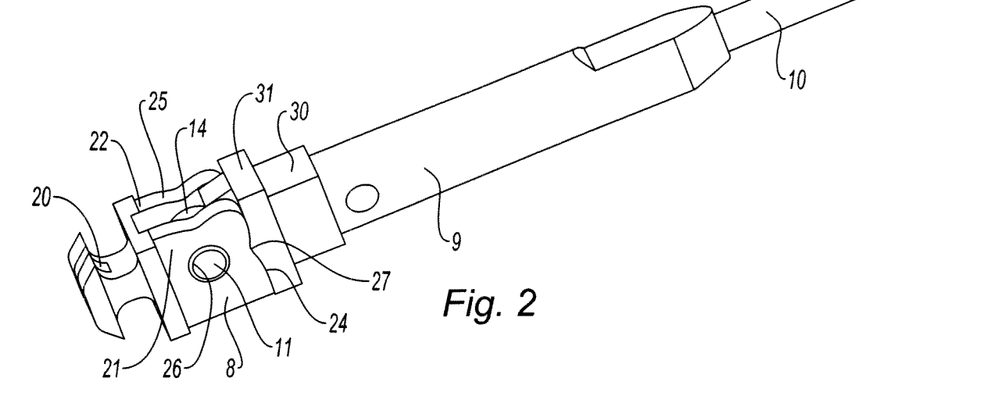
FIG. 2 is a perspective view of one of the telescopic hinges of the frame of the present method, system and device mounted on the core of a side-piece, in an opening position of the side-piece.

Thus, when the side-piece 3 is rotated from the opening position (FIGS. 2 and 3) to the closing position (FIGS. 6, 7), the transversal edges of the hinge elements roll one each other (FIG. 5) until the unshrunk lug 39 comes in abutment against the shoulder 42, thereby allowing the associated side-piece to tilt on the other side-piece fully tilted on the front side with a base 15 in an up-down position so that the shrunk closing lug 40 cannot come in abutment against the shoulder 42.

On FIG. 5, the side-piece element 9 is in an overopening position, the front shrunk closing lug 40 being in abutment, via its internal surface 45, or its front edge 44, against a stop tongue 45 (FIG. 3) extending between the two cheeks 21, 22, on the side opposite the upper side edges 25.

On FIGS. 6, 7, in a closing position of the side-piece element, because the closing lug 39 is in abutment against the shoulder 42 of the front side element 8, the upper side edges 25 of the front side element and the front lateral edges 35, 36 are not stuck one against the others.

Figure 8:
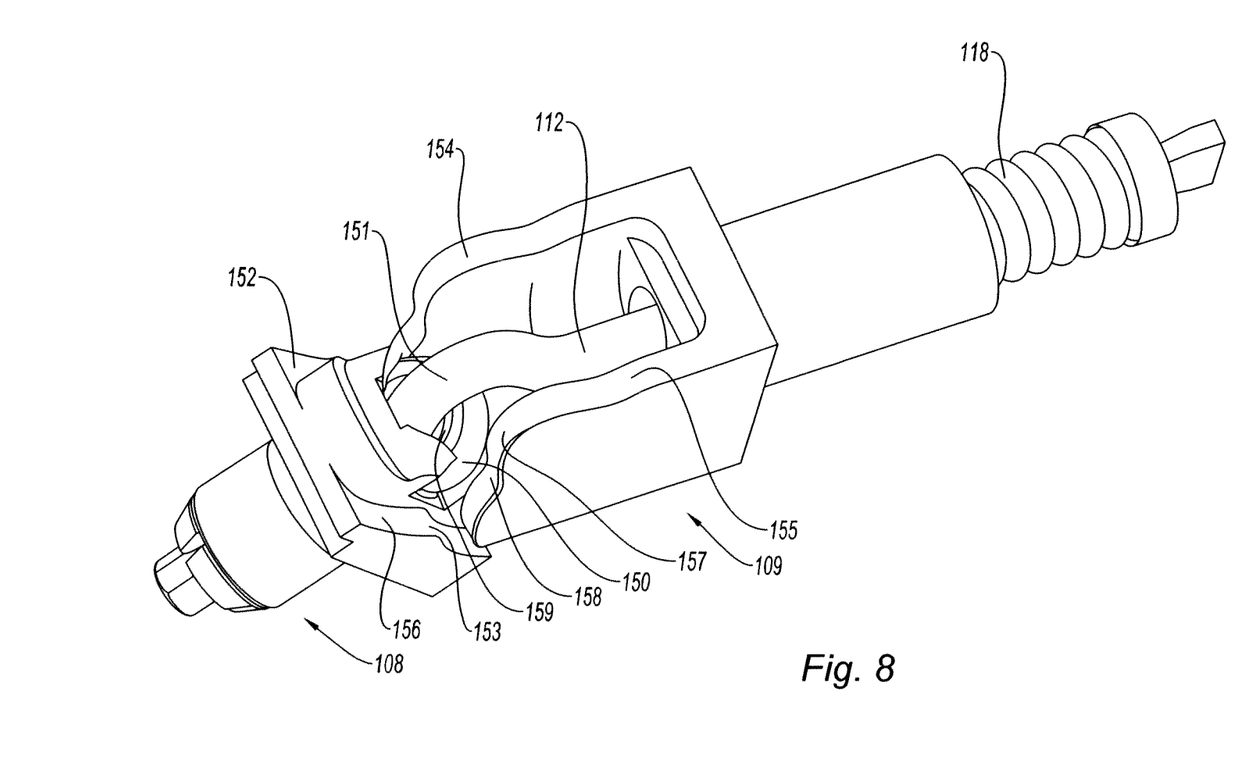
FIG. 8 is a perspective view of a particular embodiment of the hinge of the present method, system and device, referred to as a joint, in an intermediary closing position.

On FIG. 8, a joint has been represented being a particular hinge with two degrees of freedom, with two possible rotations about the two orthogonal axes.

The first hinge element 108, corresponding to the previous hinge element being anchored in the front side of the frame, is fastened to the second element 109, corresponding to the side-piece element of the previous hinge and comprising a slide 112 and a spring 118. Linking the two elements 108, 109 occurs via a knee 150 of the first element and a bent finger 151 extending the slide 112. In this alternative embodiment, the knee 150 is integral with a base 152 of the element having two irregular lateral surfaces 156 with a raised median part 153. The bent finger 151 of the slide 112 extends between the two areas 154, 155 having, as far as they are concerned, an irregular surface 157 with a recessed median part 158.

The knee 150 is drilled with a central through-hole 159 wherein the bent finger 151 extends. Such a joint thus has two degrees of freedom, one about the axis of the hole 159, when the cheeks 154, 155 of the second element 109 slide at the periphery of the knee 150 and another, being orthogonal to the first one, when the irregular surfaces of the two elements slide one on the other, as in the hinge of FIGS. 2-6.

The invention claimed is:

1. A spectacle frame comprising a front side, extended by two side tenons and two side-pieces jointed on the tenons about joint axes of two telescopic hinges, each telescopic hinge having a front side element being integral with a tenon and a side-piece element being integral with a side-piece, the side-piece element of each telescopic hinge comprising a slide having a front end jointed on the front side element about the associated joint axis and a back portion mounted slidably in a sheath against and under the action of a spring so that the sheath can move relative to the slide and is biased by the spring toward the associated joint axis, the front side element and the sheath of the side-piece element of the hinge each having a transversal opening rest surface substantially parallel to the joint axis of the hinge, such frame being characterized in that the opening rest surface of one of the front side and side-piece elements having a recessed intermediary area, the opening rest surface of the other of the front side and side-piece elements having a raised intermediary area, the opening rest surfaces of the front side element and side-piece element of each hinge being complementary to one another so as to match with one another when the side-piece is in an opening position.

2. The spectacle frame according to claim 1, wherein the opening rest surface of the one of the front side and side-piece elements has a raised convex area adjacent and extending from the recessed intermediary area.

3. The spectacle frame according to claim 1, wherein the opening rest surface of the front side element has the recessed intermediary area and a raised convex area extends from the recessed intermediary area so as to strongly bias the hinge spring when the opening rest surfaces of the front side and side-piece elements engage and slide across each other.

4. The spectacle frame according to claim 3, wherein the opening rest surface of the side-piece element has a raised intermediary area being located in the plane defined by the joint axis of the hinge and the associated slide.

5. The spectacle frame according to claim 1, wherein the transversal opening rest surface of the front side element is extended with a lateral closing rest surface, and the lateral closing rest surface of the front side element is complementary to the transversal opening rest surface of the side-piece element.

6. The spectacle frame according to claim 5, wherein the side-piece element of each hinge comprises a first closing lug arranged so as to allow for the complete tilting of the side-piece against the rear of the front side so that the complementary opening rest surfaces of the front side element and side-piece element engage one another when the side-piece is in an open position, and a second closing lug arranged so as to come in abutment against a shoulder of the front side element and prevent the complete tilting of the side-piece so that the opening rest surface of the side-piece element is prevented from fully engaging the closing rest surface of the front side element, the two lugs being arranged substantially symmetrically with respect to the plane defined by the joint axis and the corresponding slide.

7. A telescopic hinge for a spectacle frame comprising a first element being integral with a first frame part and a second element being integral with a second frame part, the second element of the hinge comprising a slide jointed with the first element and mounted slidably in a sheath against and under the action of a spring, the first element and the sheath of the second element each having opening rest surfaces, the opening rest surfaces being complementary to one another, fitting adjacent one another in an opening position, and being substantially parallel to a joint axis of the hinge, wherein the opening rest surface of one of the first and second elements of the hinge having a recessed intermediary area, the opening rest surface of the other one of the first and second elements having a raised intermediary area that is complementary to the recessed intermediary area.

8. The hinge according to claim 7, wherein the opening rest surface of the first element has a concave recessed intermediary area and a raised convex area adjacent the concave recessed intermediary area so as to strongly bias the hinge spring when the first and second frame parts are rotated relative one another and opening rest surfaces of the first and second elements slide over each other.

9. The hinge according to claim 8, wherein the opening rest surface of the second element has a raised intermediary area being located in the plane defined by the joint axis of the hinge and the associated slide.

10. The hinge according to claim 7, wherein the first element additionally comprises a closing rest surface that is contiguous with the opening rest surface of the first element, and wherein the closing rest surface of the first element is complementary to the opening rest surface of the second element.

11. The hinge according to claim 10, wherein the closing rest surface and the opening rest surface of the first element are symmetric with respect to a plane defined by a joint axis of the hinge and an area at which the opening rest surface transitions to the closing rest surface.

12. The hinge according to claim 10, wherein the second element of the hinge comprises a first closing lug arranged so as to allow for the complete tilting of the second frame part against the rear of the first frame part so that the opening rest surfaces of the first and second elements register with one another, and a second closing lug arranged so as to come in abutment against a shoulder of the first element and prevent the complete tilting of the second frame part about the joint axis so that the opening rest surface of the second element is prevented from registering with the closing rest surface of the first element, the two lugs being arranged substantially symmetrically with respect to the plane defined by the joint axis and the corresponding slide.

13. The hinge according to claim 7, wherein the first and second elements are jointed on each other about two orthogonal axes.

14. The hinge according to claim 13, wherein one of the first and second elements comprises a knee and the other one of the first and second elements comprises a bent finger mounted pivotally in a through-hole of the knee for the relative pivoting of the first and second elements about said two orthogonal axes.

15. The hinge according to claim 11, wherein the closing rest surface and opening rest surface of the first element each comprise a concave recessed intermediary area, and a convex raised area extends from the concave recessed intermediary area of the closing rest surface to the concave recessed intermediary area of the opening rest surface, and wherein the opening and closing rest surfaces in the concave recessed areas and convex raised area are smooth and contiguous.

16. The hinge according to claim 15, wherein the opening rest surface of the second element comprises a convex raised intermediary area between first and second concave recessed areas, and wherein the opening rest surface of the second element is complementary to the closing rest surface and opening rest surface of the first element.

17. A telescopic hinge for a spectacle frame, comprising:
a first element attached to a first frame part, and a second element attached to a second frame part;
a joint having a joint axis;
a slide attached to the joint and mounted slidably to one of the first and second elements, a spring acting between the slide and the one of the first and second elements to bias the one of the first and second elements toward the joint, the other of the first and second elements being connected to the joint, so that the first and second elements rotate relative one another about the joint axis between an open position and a closed position;
the first element having a first engagement surface, and the second element having a second engagement surface, the spring biasing the first and second engagement surfaces into engagement with one another;
the first engagement surface has a raised portion and a curving recessed portion adjacent the raised portion, and the second engagement surface has a recessed portion and a curving raised portion adjacent the recessed portion;
wherein the first and second engagement surfaces are complementary to one another so that the raised portion and curving recessed portion match with the recessed portion and curving raised portion, respectively, when the first and second elements are in the open position.

18. The telescopic hinge of claim 17, wherein the second engagement surface has first and second areas, each of the first and second areas having a recessed portion and a curving raised portion adjacent the recessed portion, wherein a convex raised portion extends between the recessed portion of the first area and the recessed portion of the second area, the convex raised portion having a smooth and contiguous surface.

19. The telescopic hinge of claim 18, wherein the first area of the second engagement surface is complementary to the first engagement surface and the second area of the second engagement surface is also complementary to the first engagement surface.

20. The telescopic hinge of claim 17, wherein the recessed portion is concave and the curving raised portion is convex, and a transition through and between the concave recessed portion and convex curving raised portion is smooth and contiguous.

\* \* \* \* \*